US009904416B2

(12) United States Patent
Bergman et al.

(10) Patent No.: US 9,904,416 B2
(45) Date of Patent: Feb. 27, 2018

(54) APPARATUS, METHOD AND COMPUTER PROGRAM FOR ENABLING USER INPUT

(75) Inventors: Janne Petteri Bergman, Tampere (FI); Jussi Severi Uusitalo, Hämeenlinna (FI); Pekka Virtanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 526 days.

(21) Appl. No.: 13/550,935

(22) Filed: Jul. 17, 2012

(65) Prior Publication Data

US 2014/0022181 A1 Jan. 23, 2014

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01); *G06F 2203/04108* (2013.01)

(58) Field of Classification Search
CPC .... G06F 3/044; G06F 3/0416; G06F 3/03547; G06F 2203/04101
USPC ........................................................ 345/173
See application file for complete search history.

(56) References Cited

U.S. PATENT DOCUMENTS

| | | | | |
|---|---|---|---|---|
| 6,492,979 B1* | 10/2002 | Kent et al. | ............ | G06F 3/0414 345/173 |
| 2005/0068712 A1 | 3/2005 | Schulz et al. | ................. | 361/287 |
| 2006/0279548 A1* | 12/2006 | Geaghan | ........................ | 345/173 |
| 2008/0196945 A1 | 8/2008 | Konstas | ....................... | 178/18.03 |
| 2010/0194692 A1* | 8/2010 | Orr et al. | ........................ | 345/173 |
| 2010/0258361 A1 | 10/2010 | Yamauchi et al. | ......... | 178/18.06 |
| 2011/0157045 A1 | 6/2011 | Miyazawa et al. | ........... | 345/173 |
| 2011/0157087 A1 | 6/2011 | Kanehira et al. | ............. | 345/174 |
| 2011/0193809 A1 | 8/2011 | Walley et al. | ................ | 345/173 |

FOREIGN PATENT DOCUMENTS

| | | |
|---|---|---|
| EP | 2 133 777 A2 | 12/2009 |
| EP | 2442215 A2 | 4/2012 |
| EP | 2474885 A1 | 7/2012 |
| GB | 2475735 A | 6/2011 |
| JP | 2009181232 A | 8/2009 |
| JP | 2010034828 A | 2/2010 |

(Continued)

OTHER PUBLICATIONS

Capacitive sensing. Wikipedia [encyclopedia online]. Jul. 6, 2012 [retrieved on Aug. 30, 2013]. Retrieved from the Internet: <URL: http://en.wikipedia.org/w/index.php?title=Capacitive_sensing &oldid=500949751> (4 pages).

(Continued)

*Primary Examiner* — Sahlu Okebato
(74) *Attorney, Agent, or Firm* — Harrington & Smith (57) ABSTRACT

An apparatus, method and computer program where the apparatus includes at least one processor; and at least one memory including computer program instructions; wherein the at least one memory and the computer program instructions are configured to, with the at least one processor, enable the apparatus to: determine fluctuations in a signal provided by a capacitive sensor of a touch pad; wherein if the fluctuations are below a threshold the processor is configured to determine that an object is touching the touch pad.

16 Claims, 6 Drawing Sheets

(56) References Cited

FOREIGN PATENT DOCUMENTS

| JP | 2010244514 A | 10/2010 |
|----|--------------|---------|
| JP | 2011134273 A | 7/2011 |
| JP | 2012104102 A | 5/2012 |
| WO | WO 02/093542 A1 | 11/2002 |
| WO | WO 2009/089199 A2 | 7/2009 |
| WO | WO 2011/004373 A1 | 1/2011 |

OTHER PUBLICATIONS

AD7147: CapTouch Programmable Controller for Single-Electrode Capacitance Sensors Data Sheet [online], Analog Devices, Aug. 30, 2013 [retrieved on Sep. 4, 2013]. Retrieved from the Internet: http://www.analog.com/static/imported-files/data_sheets/AD7147.pdf ; p. 19; section Noncontact proximity detection (1 page).
http://www.eetimes.com/design/embedded/4233202/How-to-use-hover-in-a-user-interface, (Dec. 14, 2011), (5 pages).
http ://androidcommunity.com/nexus-s-glove-friendly-touchscreen-is-a-winter-boon-20110104/, (Jan. 4, 2011), (13 pages).

\* cited by examiner

APPARATUS, METHOD AND COMPUTER PROGRAM FOR ENABLING USER INPUT

TECHNOLOGICAL FIELD

Embodiments of the present disclosure relate to an apparatus, method and computer program for enabling user input. In particular, they relate to an apparatus, method and computer program for enabling user input using a touch pad.

BACKGROUND

Apparatus which use touch pads to enable user inputs are known. Such touch pads may comprise capacitive sensors. The capacitive sensor may comprise a capacitive material. A user may be able to actuate a touch pad by touching the touch pad with an object such as their finger or bringing the object close to the surface of the touch pad. This causes a change in the amount of charge sourced or sunk by the capacitive sensors in the touch pad and so produces an output signal which indicates that the touch pad has been actuated.

Touch pads comprising capacitive sensors may be difficult to operate if a user uses an object other than their finger to contact the touch pad. For example, if the user, is wearing gloves or they have long fingernails they might not be able to bring their finger close enough to the sensors within the touch pad. This may make it harder to detect when the touch pad has been actuated.

It would be useful to provide a touch pad comprising sensors such as capacitive sensors which can be actuated even when the user is wearing gloves or touches the touch pad with an object such as their finger nail.

BRIEF SUMMARY

According to various but not necessarily all embodiments of the disclosure there may be provided an apparatus comprising: at least one processor; and at least one memory including computer program instructions; wherein the at least one memory and the computer program instructions are configured to, with the at least one processor, enable the apparatus to: determine fluctuations in a signal provided by a capacitive sensor of a touch pad; wherein if the fluctuations are below a threshold the processor is configured to determine that an object is touching the touch pad.

In some embodiments the apparatus may be configured so that if the fluctuations are above the threshold the processor is configured to determine that an object is hovering above the touch pad.

In some embodiments the fluctuations may be caused by unintentional movement of a user of the apparatus.

In some embodiments the fluctuations may comprise small rapid changes in the signal provided by the capacitive sensor.

In some embodiments the processor may be configured to determine that an object is touching the touch pad if a magnitude of a signal provided by the capacitive sensor is above a first level and the fluctuations are below the threshold.

In some embodiments the apparatus may be configured so that if the processor has determined that an object is touching the touch pad the processor is configured to determine that further touches to the touch pad are made in response to detecting that the magnitude of a signal provided by a capacitive sensor is above the first level.

In some embodiments the apparatus may be configured so that after the processor has determined that an object has touched the touch pad the processor is configured to determine that further touches to the touch pad are made without determining further fluctuations in signals provided by the capacitive sensors.

In some embodiments the apparatus may be configured so that after the processor has determined that an object is touching the touch pad the processor is configured to determine that further touches to the touch pad are made in response to detecting that the magnitude of a signal provided by the capacitive sensor is above the first level until an interrupt is detected.

In some embodiments the interrupt may comprise a determination that a time period has expired.

In some embodiments the interrupt may comprise a detection of a signal from a capacitive sensor where the magnitude of the signal is above a second level where the second level is larger than the first level.

According to various but not necessarily all embodiments of the disclosure there may be provided a method comprising: determining fluctuations in a signal provided by a capacitive sensor of a touch pad; and determining that an object is touching the touch pad if the fluctuations are below a threshold.

In some embodiments the method may further comprise determining that an object is hovering above the touch pad if the fluctuations are above the threshold.

In some embodiments the fluctuations may be caused by unintentional movement of a user of the apparatus.

In some embodiments the fluctuations may comprise small rapid changes in the signal provided by the capacitive sensor.

In some embodiments the method may comprise determining that an object is touching the touch pad if a magnitude of a signal provided by the capacitive sensor is above a first level and the fluctuations are below the threshold.

In some embodiments the method may further comprise determining that further touches to the touch pad are made in response to detecting that the magnitude of a signal provided by a capacitive sensor is above the first level.

In some embodiments the determining of further touches to the touch pad may be made without determining further fluctuations in signals provided by the capacitive sensors.

In some embodiments after determining that an object is touching the touch pad the method may further comprise determining that further touches to the touch pad are made in response to detecting that the magnitude of a signal provided by the capacitive sensor is above the first level until an interrupt is detected.

In some embodiments the interrupt may comprise a determination that a time period has expired.

In some embodiments the interrupt may comprise a detection of a signal from a capacitive sensor where the magnitude of the signal is above a second level where the second level is larger than the first level.

According to various but not necessarily all embodiments of the disclosure there may be provided a computer program comprising computer program instructions that, when executed by at least one processor, enable an apparatus at least to perform: determining fluctuations in a signal provided by a capacitive sensor of a touch pad; and determining that an object is touching the touch pad if the fluctuations are below a threshold.

In some embodiments there may be provided a computer program comprising program instructions for causing a computer to perform the method described above.

In some embodiments there may be provided a computer program as described above.

In some embodiments there may be provided an electromagnetic carrier signal carrying the computer program as described above.

The apparatus may be for communication. For example, the apparatus may be for wireless communication.

BRIEF DESCRIPTION

For a better understanding of various examples of embodiments of the present disclosure reference will now be made by way of example only to the accompanying drawings in which.

DETAILED DESCRIPTION

The Figures illustrate an apparatus 1 comprising: at least one processor 3; and at least one memory 5 including computer program instructions 11; wherein the at least one memory 5 and the computer program instructions are configured to, with the at least one processor 3, enable the apparatus 1 to: determine fluctuations in a signal provided by a capacitive sensor 35 of a touch pad 15; wherein if the fluctuations are below a threshold the processor 3 is configured to determine that an object is touching the touch pad 15.

Figure 1:
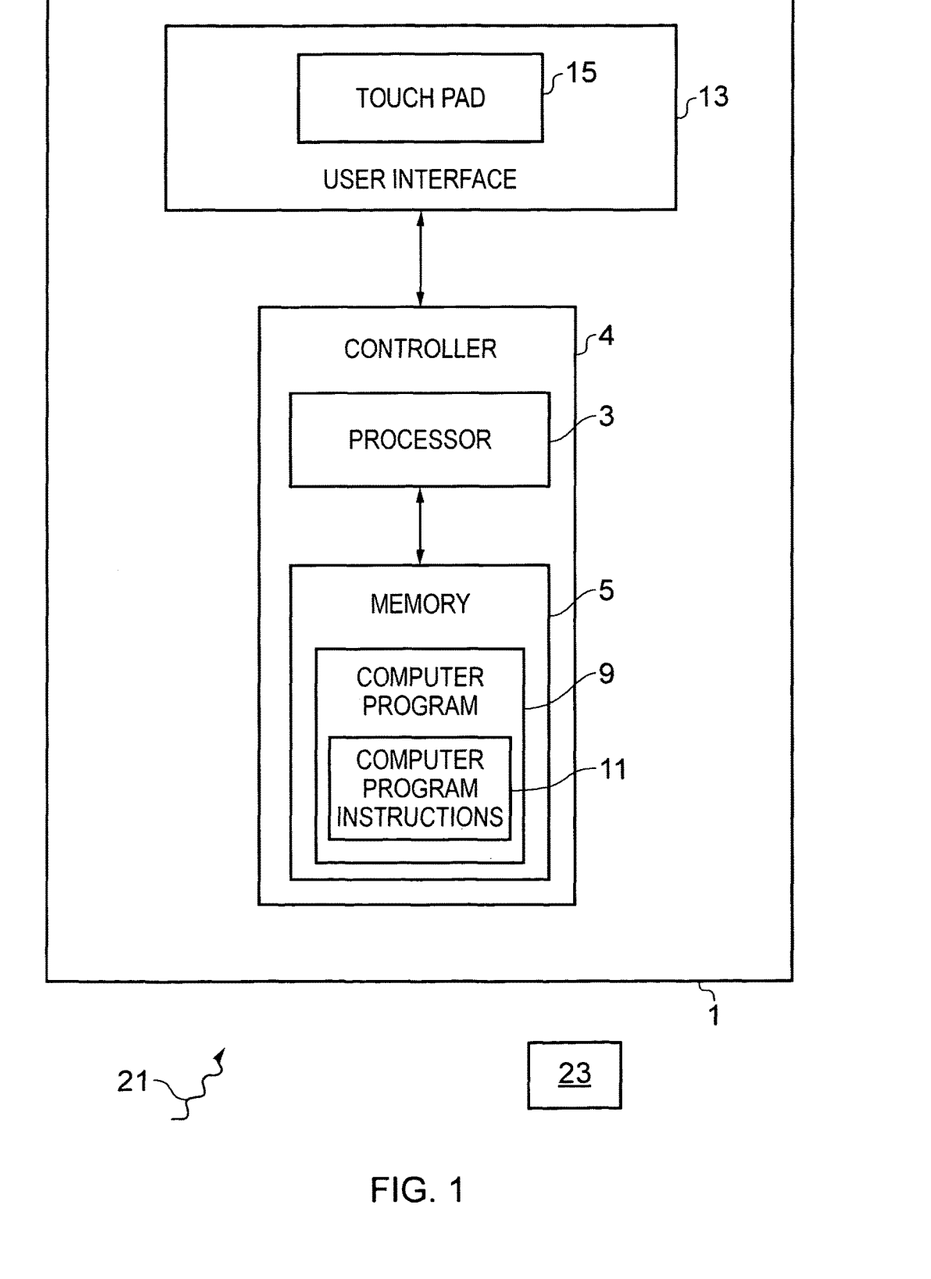
FIG. 1 schematically illustrates an apparatus according to an embodiment of the disclosure.

FIG. 1 schematically illustrates an apparatus 1 according to an example embodiment of the disclosure. The apparatus 1 may be an electronic apparatus. The apparatus 1 may be, for example, a mobile cellular telephone, a personal computer, a camera, a gaming device, a personal digital assistant, an electronic book reader, a personal music player, a tablet computer or any other similar apparatus which may comprise a touch pad. The apparatus 1 may be a handheld apparatus 1 which can be carried in a user's hand, handbag or pocket of their clothing for example.

Features referred to in the following description are illustrated in FIG. 1. However, it should be appreciated that the apparatus 1 may comprise additional features that are not illustrated. For example, in embodiments of the disclosure where the apparatus 1 is a mobile cellular telephone or other communications device, the apparatus 1 may also comprise one or more transmitters and receivers configured to enable communication or wireless communication.

Figure 2:
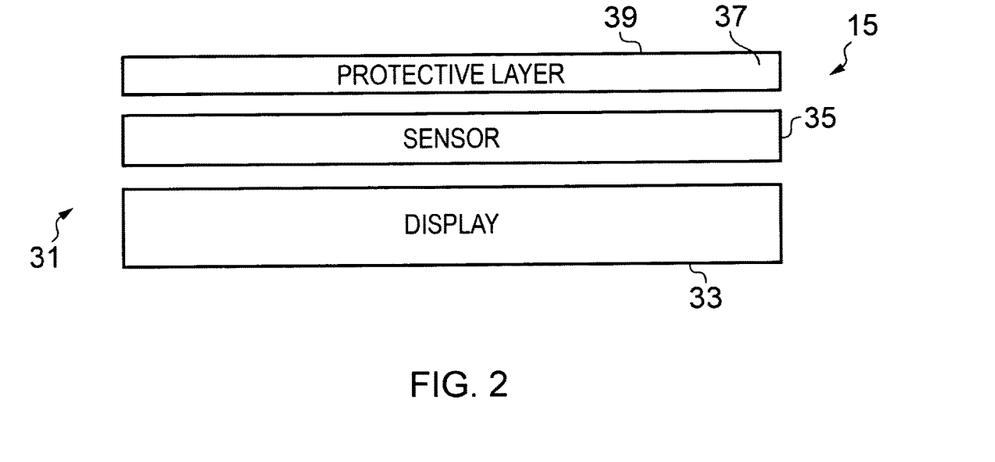
FIG. 2 schematically illustrates a touch pad according to an embodiment of the disclosure.

The apparatus 1 illustrated in FIG. 1 comprises: a user interface 13 and a controller 4. In the illustrated embodiment the controller 4 comprises at least one processor 3 and at least one memory 5 and the user interface 13 comprises a touch pad 15. The touch pad 15 may be part of a touch sensitive display 31 as illustrated in FIG. 2.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc.) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet.

The controller 4 may also be configured to enable the apparatus 1 to determine fluctuations in a signal provided by a capacitive sensor of a touch pad 15; and determine that an object is touching the touch pad 15 if the fluctuations are below a threshold.

The at least one processor 3 may be configured to receive input commands from the user interface 13 and also to provide output commands to the user interface 13. The at least one processor 3 may also be configured to write to and read from the at least one memory 5. The outputs of the user interface 13 may be provided as inputs to the controller 4.

The at least one memory 5 may be configured to store a computer program 9 comprising computer program instructions 11 that control the operation of the apparatus 1 when loaded into the at least one processor 3. The computer program instructions 11 may provide the logic and routines that enable the apparatus 1 to perform the example methods illustrated in FIGS. 4 and 5 and 6. The at least one processor 3 by reading the at least one memory 5 may be able to load and execute the computer program 9.

The computer program instructions 11 may provide computer readable program means configured to control the apparatus 1. The computer program instructions 11 may provide, when loaded into the controller 4; means for determining fluctuations in a signal provided by a capacitive sensor of a touch pad; and means for determining that an object is touching the touch pad if the fluctuations are below a threshold.

The computer program 9 may arrive at the apparatus 1 via any suitable delivery mechanism 21. The delivery mechanism 21 may be, for example, a computer-readable storage medium, a computer program product 23, a memory device, and a record medium such as a CD-ROM or DVD, an article of manufacture that tangibly embodies the computer program 9. The delivery mechanism may be a signal configured to reliably transfer the computer program 9. The apparatus 1 may propagate or transmit the computer program 9 as a computer data signal.

Although the memory 5 is illustrated as a single component in FIG. 1 it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In the example embodiment illustrated in FIG. 1 the user interface 13 comprises a touch pad 15. The touch pad 15 may comprise any means which may enable a user to make an input into the apparatus 1 by touching the surface of the touch pad 15 with an object or bringing an object into proximity of the surface of the touch pad 15. The touch pad 15 may comprise means which enables a user of the apparatus 1 to input information into the apparatus 1. The information may be used to control the apparatus 1.

In some embodiments of the disclosure the user interface 13 may also comprise other user input devices such as a keypad a joystick or navigation key or a combination of different types of user input devices. In some embodiments of the disclosure the user interface 13 may also comprise user output devices such as a display or audio output device or any other suitable output device.

In some embodiments of the disclosure the touch pad 15 may be part of touch sensitive display 31. An example touch sensitive display 31 is illustrated schematically in FIG. 2. The example touch sensitive display 31 of FIG. 2 comprises a display 33, a sensor 35 and a protective cover layer 37. It is to be appreciated that in other embodiments of the disclosure the touch sensitive display 31 may comprise other components.

The display 33 may comprise any means which enables information to be displayed to a user of the apparatus 1. The information may correspond to information which has been input by the user via the touch pad 15 or other user input devices, information which is stored in the one or more memories 5 or information which has been received by apparatus 1.

The display 33 may comprise any suitable display such as a liquid crystal display, light emitting diode, thin film transistor or any other suitable type of display.

The sensor 35 may be positioned overlaying the display 33. The sensor 35 may comprise any means which may be configured to detect when a user touches the surface of the touch pad 15 with an object. In some embodiments of the disclosure the sensor 35 may be configured to detect when a user brings an object close to the surface of the touch pad 15 even if the object does not touch the surface of the touch pad 15.

In some embodiments of the disclosure the sensor 35 may comprise one or more capacitive sensors. The capacitive sensor 35 may comprise a layer of capacitive material. In some embodiments of the disclosure the capacitive material may be arranged in a grid or other suitable array. The capacitive material may be transparent to enable the display 33 to be visible though the sensor 35. The capacitive material may comprise any suitable material such as indium tin oxide.

The capacitive material may be configured so that when a user can actuate the capacitive sensor 35 by touching the surface of the touch pad 15 or bringing an object close to the surface of the touch pad 15. This causes charge to be sourced or sunk by the capacitive sensor which changes the capacitance of the sensor 35. This enables the actuation to be detected and may enable the sensor 35 to provide an output signal indicative of the change in the actuation. In some embodiments the output signal may analysed to obtain information about the actuations such as the location and duration or any other suitable information.

The output signal of the capacitive sensor 35 may be provided to the processor 3. The output signal provided by the capacitive sensor 35 may have a magnitude. The magnitude of the output signal may provide an indication of the size of the change in the capacitance of the capacitive material. The output signal of the capacitive sensor 35 may also provide an indication of the location of the area of the surface of the touch pad 15 which has been actuated.

In the example embodiment of FIG. 2 a protective layer 37 is provided overlaying the sensor 35 and display 33. The protective layer 37 provides a surface 39 which the user of the apparatus 1 can touch to actuate the touch pad 15.

In some embodiments of the disclosure the protective layer 37 may form part of a housing of the apparatus 1. The surface 39 of the protective layer 37 may form a part of the outer surface of the apparatus 1.

The protective layer 37 may be transparent so that the display 33 is visible through the protective layer 37. The protective layer 37 may comprise an insulating material.

Figure 3:
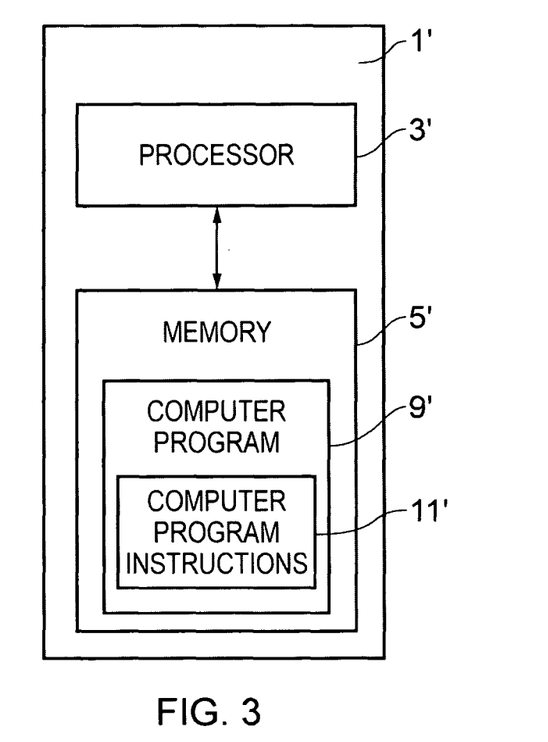
FIG. 3 schematically illustrates another apparatus according to an embodiment of the disclosure.

FIG. 3 illustrates an apparatus 1' according to another embodiment of the disclosure. The apparatus 1' illustrated in FIG. 3 may be a chip or a chip-set. The apparatus 1' comprises at least one processor 3 and at least one memory 5 as described above in relation to FIG. 1. The apparatus 1' may be contained within a housing comprising one or more touch pads 15.

Figure 4:
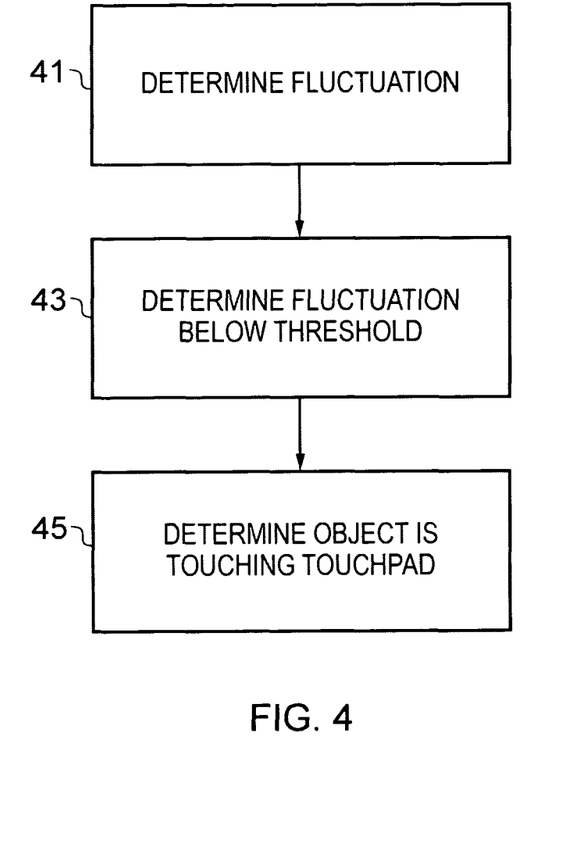
FIG. 4 schematically illustrates a method according to an embodiment of the disclosure.

FIG. 4 illustrates a method according to an example embodiment of the disclosure. The method may be implemented using the apparatus 1 and touch pads 15 of FIGS. 1 to 3.

At block 41 fluctuations in a signal provided by a capacitive sensor 35 are determined. The signal may be provided in response to a change in the charge stored in the capacitive material of the sensor 35. The change in the charge stored may be caused by a user touching the surface 39 of the touch pad 15 with their finger or some other object such as a stylus or the user bringing their finger or other object in close proximity with the surface 39 of the touch pad 15.

In some embodiments of the disclosure, when the user tries to touch the surface 39 of the touch pad 15 there may be a barrier between the skin of the user's finger and the touch pad 15. For example the user may be wearing gloves and the material of the gloves may act as a barrier between the skin of the user and the surface 39 of the touch pad 15. In other embodiments the user may have long fingernails and may touch the surface 39 of touch pad 15 with their finger nail rather than the skin of their finger. The material of the gloves and the fingernail may act as a further insulating layer between the user's finger and the capacitive sensor 35. This effectively increases the separation between the user's finger and the capacitive sensor 35 compared to the separation if the user touched the surface 39 of the touch pad 15 directly with their finger. This may result in a smaller change in the capacitance of the sensor 35 than if the user touched the surface 39 of the touch pad 15 directly with their finger. This may result in the output signal provided by the capacitive sensor 35 having a smaller magnitude.

The fluctuations in the output signal may be detected by the processor 3. The fluctuations may comprise small and rapid changes in the signal provided by the capacitive sensor 35. The fluctuations may comprise jitter in the output signal provided by the capacitive sensor 35.

The fluctuations may be caused by unintentional movement of the user of the apparatus 1. The fluctuations may be caused by unintentional movement of the hand of the user relative to the surface 39 of the touch pad 15. The unintentional movement may comprise small and/or rapid movement of part of the user relative to the apparatus 1. The unintentional movement may comprise, for example, a shaking of the hand of the user.

At block 43 the processor 3 may determine that the amount of fluctuation in the signal is below a threshold. The threshold may comprise the size of the fluctuations or the increase in the magnitude of the signal caused by the fluctuations. In some embodiments the threshold may comprise the number of changes within the output signal within a given time period. It is to be appreciated that in some embodiments the threshold may also comprise both the size of the fluctuations and the number of changes within a given time period.

At block 45 the processor 3 may determine that because the amount of fluctuation in the signal is below a threshold the user is touching the touch pad with an object. The direct contact between the object and the surface 39 of the touch pad 15 may make the user's hand more stable and reduce the unintentional movement of the user. This results in less fluctuation in signals which are provided in response to the user actually touching the surface 39 of the touch pad 15. Therefore this may enable the processor 3 to determine that the surface 39 of the touch pad 15 has been touched even if the user has worn gloves or touched the touch pad 15 with an object such as their fingernail.

Once the processor 3 has determined that the surface 39 of the touch pad 15 has been touched the processor 3 may also determine the location of the touch pad which has been touched. The processor 3 may also enable the apparatus in response to the detected touch of the touch pad 15.

Figure 5:
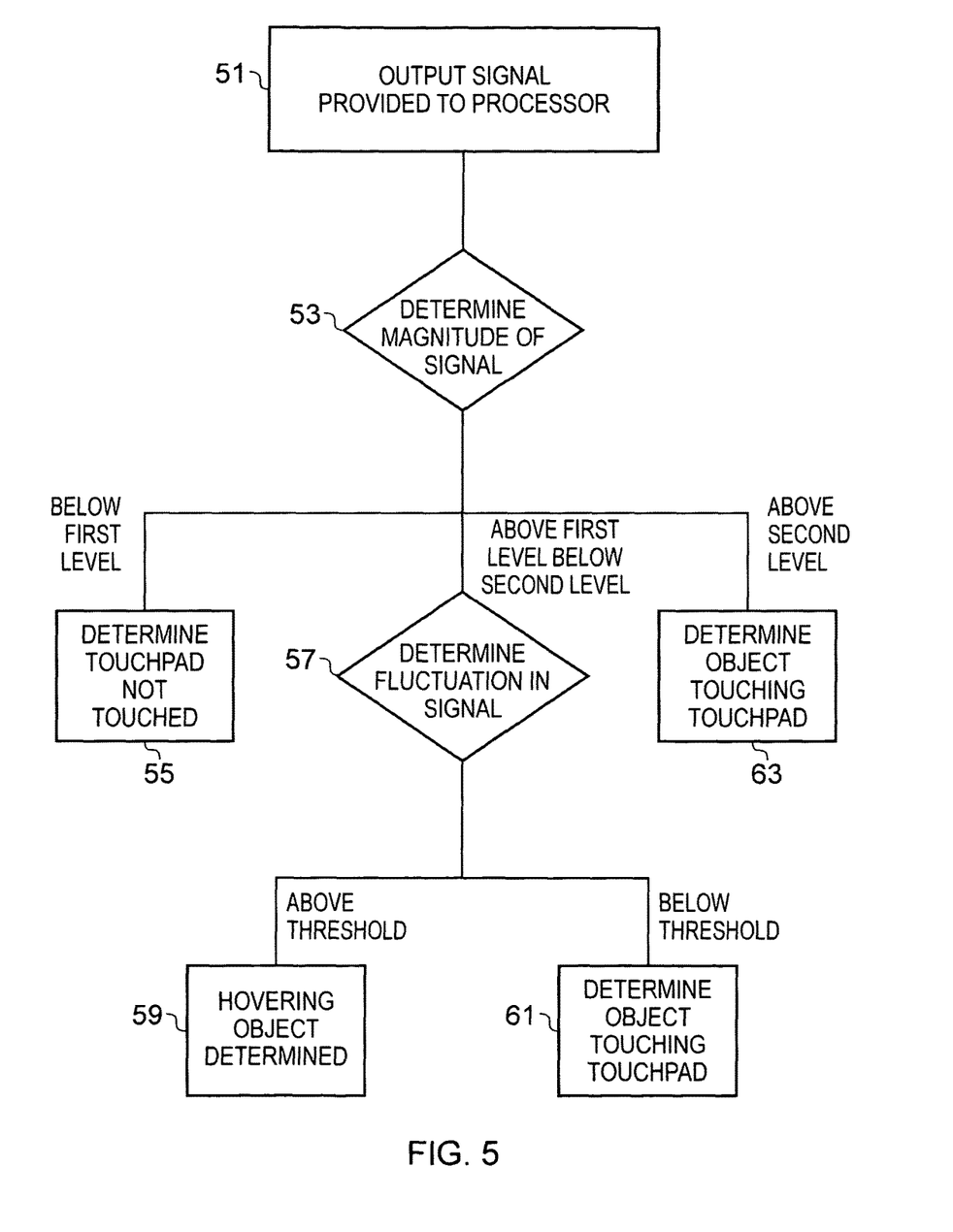
FIG. 5 schematically illustrates another method according to an embodiment of the disclosure.

FIG. 5 illustrates a further method according to another example embodiment of the disclosure. The method may be implemented using the apparatus 1 and touch pads 15 of FIGS. 1 to 3.

In the example method of FIG. 5 an output signal is provided by a capacitive sensor 35 at block 51. The signal may be provided to the processor 3. The output signal may be provided in response to an object coming close enough to the surface 39 of the touch pad 15 to be detected by the capacitive sensor 35.

At block 53 the magnitude of the signal provided by the capacitive sensor 35 may be determined. The processor 3 may be configured to determine the magnitude of the signal provide by the capacitive sensor 35. The magnitude of the signal provided by the capacitive sensor 35 may depend upon the proximity of an object to the surface 39 of the touch pad 15. For example an object touching the surface 39 of the touch pad 15 may provide a larger signal than the same object being positioned close to but not physically touching the surface 39 of the touch pad 15.

The magnitude of the output signal provided by the capacitive sensor 35 may also depend upon the object which is used to actuate the touch pad 15. For example if a user touches the surface 39 of the touch pad 15 when they are wearing gloves this will produce a smaller signal than the same user touching the surface 39 of the same touch pad 15 with the same finger without the glove. The material of the glove acts as an electrical insulator between the skin of the user. This effectively increases the separation between user's finger and the capacitive sensor 35 and so reduces the capacitance of the capacitive sensor 35. Similarly if the user uses their fingernail or a stylus this may result in a smaller output signal being provided by the capacitive sensor 35.

If it is determined, at block 53 that the magnitude of the signal provided by the capacitive sensor 35 is below a first level then it may be determined, at block 55, that the surface 39 of the touch pad 15 has not been touched. For example, the output signal may be provided in response to a small change in capacitance which may arise as a result of the touch pad 15 coming close to other objects. For example the other objects may be at a distance of 15 mm from the touch pad 15.

If it is determined that the surface 39 of the touch pad 15 has not been touched then the processor 3 may be configured to disregard the detected signal. The processor 3 may determine that the touch pad 15 has not been actuated. The processor 3 may be configured so that no other functions of the apparatus 1 are enabled in response to detected signals with a magnitude below the first level.

If it is determined at block 53 that the magnitude of the signal provided by the capacitive sensor 35 is above the first level but below a second level then, at block 57, the fluctuations in the signal may be determined. The second level may correspond to a larger magnitude than the first level.

As mentioned above the fluctuations may comprise small and/or rapid changes in the signal provided by the capacitive sensor 35 which may arise as a result of unintentional movement of the user. The processor 3 may be configured to determine whether or not the fluctuations are above a predetermined threshold. The threshold may comprise a threshold of the magnitude of the fluctuations. In some embodiments the threshold may comprise a threshold in the number of fluctuations detected within a predetermined amount of time and/or area.

If it is determined that the fluctuations are above a threshold then, at block 59, it is determined that an object may be hovering above the surface 39 of the touch pad 15 but not actually touching the surface 39. For example a user may have their finger in proximity to the surface 39 of the touch pad 15 but not actually touching it.

The fluctuations may be above the threshold because there is no contact between the surface 39 of the touch pad 15 and the object. This allows the object to move relative to the surface 39 of the touch pad 15. For example the user's fingers or hands may shake unintentionally which may cause the fluctuations in the output signal of the capacitive sensor 35.

In some embodiments of the disclosure it may be determined that as the user is not actually touching the surface 39 of the touch pad 15 no input is made. The processor 3 may be configured to disregard the detected signal after it has been determined that the fluctuations are above the threshold. The processor 3 may determine that the touch pad 15 has not been actuated and may be configured so that no other functions of the apparatus 1 are enabled in response to detected signals with a magnitude above the first level and below a second level and with a level of fluctuations above a threshold.

In some embodiments of the disclosure it may be determined that even though the user is not actually touching the surface 39 of the touch pad 15 a user input may be made. For example it may be determined that the user is making a hover input. In such embodiments once it has been determined that the object is hovering above the surface 39 of the touch pad 15 the processor 3 may determine the location of the touch pad 15 which has been actuated and enable an appropriate function to be performed.

If it is determined that the fluctuations are below a threshold then, at block 61, it is determined that an object may be touching the surface 39 of the touch pad 15. The signal provided by the capacitive sensor 35 may be below the second level because of the physical properties of the object that are used to touch the surface 39 of the touch pad 15. For example a user may be wearing gloves or may be touching the surface 39 of the touch pad 15 with their finger nail or other object such as a stylus.

The fluctuations may be below the threshold because there is contact between the surface 39 of the touch pad 15 and the object. The contact steadies the object relative to the surface 39 of the touch pad 15. This reduces the amount of unintentional movement of the object and reduces the fluctuations in the output signal of the capacitive sensor 35.

Once it has been determined that the user has touched the surface 39 of the touch pad 15 the processor 3 may be configured to enable a function to be performed in response to the user actuation of the touch pad 15. The function which is enabled may depend on factors such as the area of the touch pad 15 which has been actuated, the mode of operation of the apparatus 1 or the type of input which has been made, for example.

If it is determined, at block 53 that the magnitude of the signal provided by the capacitive sensor 35 is above the second level then it may be determined, at block 63, that the surface 39 of the touch pad 15 has been touched and that the physical properties of the object which is touching the surface 39 of the touch pad 15 are such that the signal provided by the capacitive sensor 35 is above the second level. For example a user may be touching the surface 39 of the touch pad 15 with a finger.

Once it has been determined that the user has touched the surface 39 of the touch pad 15 the processor 3 may be configured to enable a function to be performed in response to the user actuation of the touch pad 15. The function which is enabled may depend on factors such as the area of the touch pad 15 which has been actuated, the mode of operation of the apparatus 1 or the type of input which has been made, for example.

Embodiments of the disclosure provide a touch pad 15 which may comprise a capacitive sensor 35 which may be actuated by a user even if the user touches the touch pad 15 with an object such as a gloved finger, a fingernail a stylus, a pen or any other object. This may make the touch pad more convenient for a user to use.

Also embodiments of the disclosure may be used in apparatus comprising only capacitive sensors 35. There is no need for other types of sensors such as resistive or strain sensors to detect when an object is touching the surface 39 of the touch pad 15.

Figure 6:
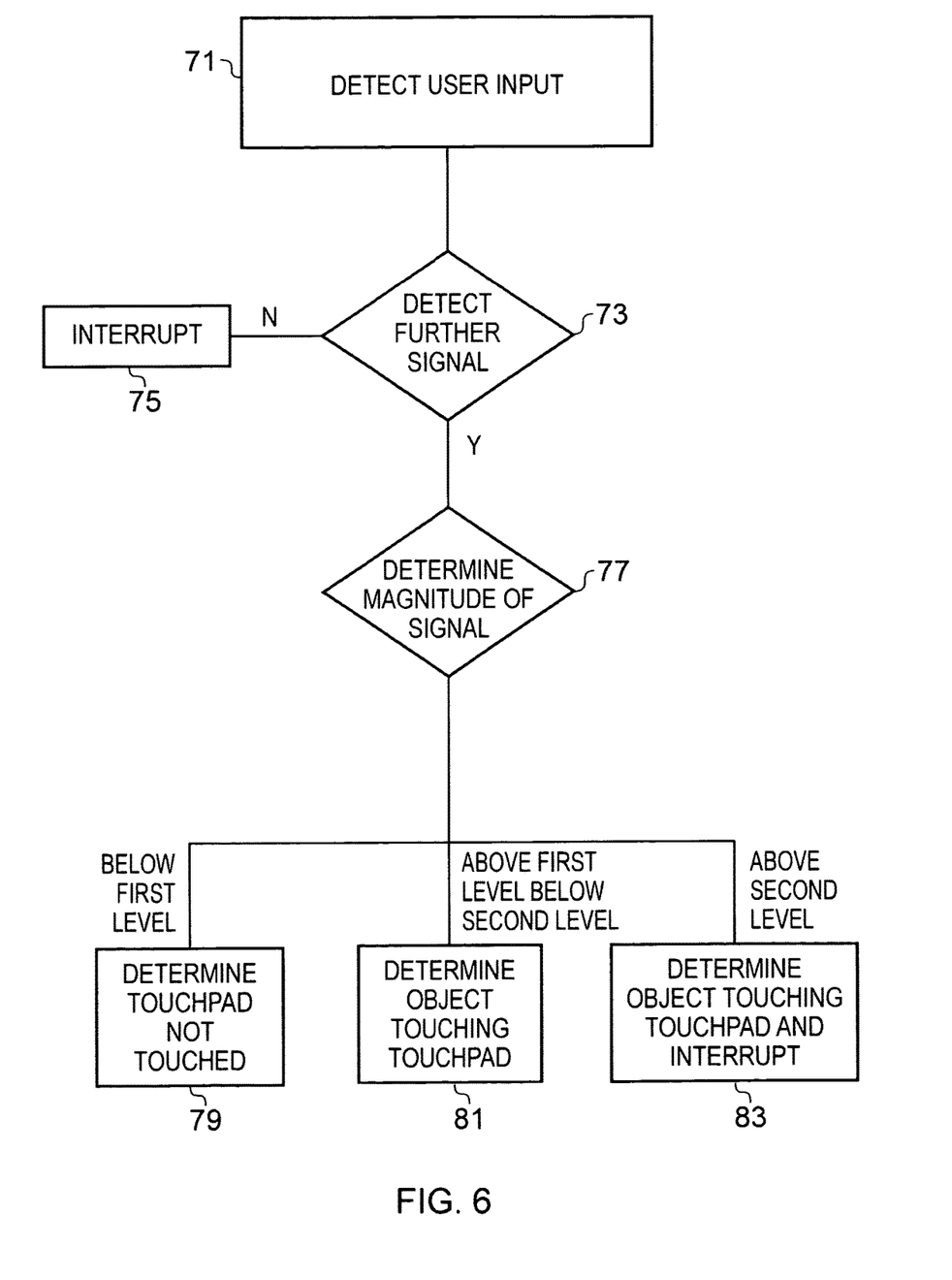
FIG. 6 schematically illustrates a further method according to an embodiment of the disclosure.

FIG. 6 illustrates a further method according to another embodiment of the disclosure. The further method of FIG. 6 may be used to detect further inputs after a first input has been detected as described above. The method may be implemented using the apparatus 1 and touch pads 15 of FIGS. 1 to 3.

In the method illustrated in FIG. 6 after the processor 3 has determined that an object is touching the touch pad 15 as described above in relation to FIGS. 4 and 5 the processor 3 may be configured to determine that further touches to the touch pad are made in response to detecting that the magnitude of a signal provided by a capacitive sensor 35 is above the first level even if the magnitude is below the second level. In the example method illustrated in FIG. 6 the processor may determine the further inputs without determining further fluctuations in signals provided by the capacitive sensor 35. The processor 3 may continue to determine that further touches to the touch pad are made in response to detecting that the magnitude of a signal provided by the capacitive sensor is above the first level until an interrupt is detected.

At block 71 a user input is detected as described above in relation to FIGS. 4 and/or 5. The user input comprises a user touching the surface 39 of the touch pad 15 with an object but that the physical properties of the object are such that the signal provided by the capacitive sensor 35 is below the second level. For example, the user may touch the surface 39 of the touch pad 15 with a gloved finger.

At block 73 the processor 3 determines whether or not there is a further output signal provided by the capacitive sensor 35. If it is determined that there is no further signal provided then at block 75 an interrupt is detected. Once the interrupt has been detected any further outputs provided by the capacitive sensor 35 may be handled using the methods illustrated in FIGS. 4 and 5 and described above.

If it is determined that there is a further signal provided then at block 77 the processor 3 determines a magnitude of the further signal provided by the capacitive sensor 35.

If the magnitude of the signal provided by the capacitive sensor 35 is below the first level then, as described above in relation to FIG. 5, the processor 3 may determine that no object has touched the surface 39 of the touch pad 15 and it may be determined that no input has been made.

If the magnitude of the signal provided by the capacitive sensor 35 is above the first level but below the second level then the processor 3 may determine, at block 81, that an object is touching the surface 39 of the touch pad 15. As the previous input made was determined to be made by an object where the physical properties of the object are such that the signal provided by the capacitive sensor 35 is below the second level the processor 3 may automatically recognise subsequent inputs made with the same or similar objects without determining the fluctuations. This effectively lowers the second level of the magnitude of the signal to the first level and may enable the processor 3 to recognise the subsequent inputs without having to determine the fluctuation in the output signal of the capacitive sensor 35. This may reduce the amount of time and processing power needed to detect the subsequent inputs. This may make the touch pad 15 more responsive for a user to use because there would be no need to measure the further fluctuations.

At some point the user may start using a different object to actuate the touch pad 15. For example the user may have removed their gloves and may be touching the surface 39 of the touch pad 15 with their bare finger. In such circumstances the signal provided by the capacitive sensor 35 is above the original second level. The original second level may be significantly above the effective lowered second level (which may be the original first level) therefore the processor 3 may determine, at block 83, that an object is touching the surface 39 of the touch pad 15 and that the physical properties of the object which is touching the surface 39 of the touch pad 15 are such that the signal provided by the capacitive sensor 35 are significantly above the effective lowered second level.

The determination at block 83 that the user has touched the surface 39 of the touch pad 15 with an object which has physical properties such that the signal provided by the capacitive sensor 35 is above the second level this may provide an interrupt. After the interrupt any subsequent inputs may be handled as described above in relation to FIGS. 4 and 5 and the respective levels of the output signals may be returned to their original or similar values.

The embodiments of the disclosure illustrated in FIG. 6 and described above provide an apparatus and touch pad where the sensitivity of the touch pad 15 may be changed in response to determining that the user has actuated the surface 39 of the touch pad 15 with an object such as a gloved finger or their finger nail. After such an input the processor 3 may be configured to recognise all input signal above an adjusted second level as inputs until an interrupt has been detected. The interrupt may be that no further input is detected within a predetermined time or that a particular type of further input is detected or any other suitable signal.

This may make the touch pad more responsive as it enables the processor 3 to quickly recognise input signals.

The interrupt also enables the touch pad 15 to be switched back to a lower sensitivity mode of operation. Once the touch pad 15 is in the lower sensitivity mode of operation the processor 3 might not recognise an output signal from the capacitive sensor 35 with a magnitude below the second level as a user input. This may avoid the touch pad 15 being actuated inadvertently, for example, if it is being carried by a user in a bag or pocket.

The blocks illustrated in the FIGS. 4 and 5 and 6 may represent steps in a method and/or sections of code or instructions in the computer program 9. The illustration of a particular order to the blocks does not necessarily imply that there is a required or preferred order for the blocks and the order and arrangement of the block may be varied. Furthermore, it may be possible for some blocks to be omitted.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one memory including computer program instructions;
   wherein the at least one memory and the computer program instructions are configured to, with the at least one processor, enable the apparatus to:
   determine a magnitude of a signal provided by a capacitive sensor of a touch pad in response to an object proximal to a surface of the touch pad;
   determine a location of the object based on the signal provided by the capacitive sensor; and
   determine fluctuations in the signal provided by the capacitive sensor of the touch pad in response to a motion of the object;
   wherein the processor is configured to determine that the object is touching the touch pad if the magnitude is above a first level and the fluctuations are below a threshold;
   wherein the processor is configured to detect the presence of a barrier between the touch pad and the object based on the magnitude and the fluctuations and to detect the location of the object through the barrier relative to the touchpad using the capacitive sensor; and
   wherein the fluctuations comprise small rapid changes in the signal provided by the capacitive sensor.

2. An apparatus as claimed in claim 1 wherein if the fluctuations are above the threshold the processor is configured to determine that the object is hovering above the touch pad.

3. An apparatus as claimed in claim 1 wherein the fluctuations are caused by unintentional movement of a user of the apparatus.

4. An apparatus as claimed in claim 1 wherein after the processor has detected the barrier, the processor is configured to determine that further touches by the barrier to the touch pad are made in response to detecting that the magnitude of a signal provided by the capacitive sensor is above the first level.

5. An apparatus as claimed in claim 4 wherein after the processor has detected the barrier, the processor is configured to determine that further touches by the barrier to the touch pad are made without determining further fluctuations in signals provided by the capacitive sensors.

6. An apparatus as claimed in claim 4 wherein after the processor has detected the barrier, the processor is configured to determine that further touches by the barrier to the touch pad are made in response to detecting that the magnitude of a signal provided by the capacitive sensor is above the first level until an interrupt is detected.

7. An apparatus as claimed in claim 6 wherein the interrupt comprises a determination that a time period has expired.

8. An apparatus as claimed in claim 6 wherein the interrupt comprises a detection of a signal from the capacitive sensor where the magnitude of the signal is above a second level where the second level is larger than the first level.

9. A method comprising:
   determining a magnitude of a signal provided by a capacitive sensor of a touch pad in response to an object proximal to a surface of the touch pad;
   determining a location of the object based on the signal provided by the capacitive sensor;
   determining fluctuations in the signal provided by the capacitive sensor of the touch pad in response to a motion of the object;
   determining that the object is touching the touch pad if the magnitude is above a first level and the fluctuations are below a threshold; and
   detecting the presence of a barrier between the touch pad and the object based on the magnitude and the fluctuations and the location of the object through the barrier relative to the touchpad using the capacitive sensor;
   wherein the fluctuations comprise small rapid changes in the signal provided by the capacitive sensor.

10. A method as claimed in claim 9 further comprising determining that the object is hovering above the touch pad if the fluctuations are above the threshold.

11. A method as claimed in claim 9 wherein the fluctuations are caused by unintentional movement of a user of the apparatus.

12. A method as claimed in claim 9 further comprising determining that further touches by the barrier to the touch pad are made in response to detecting that the magnitude of, a signal provided by the capacitive sensor is above the first level.

13. A method as claimed in claim 12 wherein the determining of further touches by the barrier to the touch pad is made without determining further fluctuations in signals provided by the capacitive sensors.

14. A method as claimed in claim 12 after determining that the object is touching the touch pad the method further comprises determining that further touches by the barrier to the touch pad are made in response to detecting that the magnitude of a signal provided by the capacitive sensor is above the first level until an interrupt is detected.

15. A non-transitory computer readable medium embodying a computer program comprising computer program instructions that, when executed by at least one processor, enable an apparatus at least to perform:
   determining a magnitude of a signal provided by a capacitive sensor of a touch pad in response to an object proximal to a surface of the touch pad;
   determining a location of the object based on the signal provided by the capacitive sensor;
   determining fluctuations in the signal provided by the capacitive sensor of the touch pad in response to a motion of the object;
   determining that the object is touching the touch pad if the magnitude is above a first level and the fluctuations are below a threshold; and
   detecting the presence of a barrier between the touch pad and the object based on the magnitude and the fluctuations and the location of the object through the barrier relative to the touchpad using the capacitive sensor;
   wherein the fluctuations comprise small rapid changes in the signal provided by the capacitive sensor.

16. A non-transitory computer readable medium embodying a computer program comprising program instructions for causing a computer to perform the method of claim 9.

* * * * *